US012812741B2

(12) United States Patent
Teng

(10) Patent No.: US 12,812,741 B2
(45) Date of Patent: Nov. 24, 2026

(54) MICROWAVE HEATING DEVICE FOR LIQUID

(71) Applicant: WAVE POWER TECHNOLOGY INC., Toufen City (TW)

(72) Inventor: Hsuan-Hao Teng, Toufen City (TW)

(73) Assignee: WAVE POWER TECHNOLOGY INC., Toufen City (TW)

( * ) Notice: Subject to any disclaimer, the term of this patent is extended or adjusted under 35 U.S.C. 154(b) by 561 days.

(21) Appl. No.: 18/410,751

(22) Filed: Jan. 11, 2024

(65) Prior Publication Data

US 2025/0234431 A1 Jul. 17, 2025

(51) Int. Cl.
*H05B 6/80* (2006.01)

(52) U.S. Cl.
CPC .................................... *H05B 6/802* (2013.01)

(58) Field of Classification Search
CPC . H05B 6/804; H05B 6/80; H05B 6/64; H05B 6/00; H05B 6/802
USPC .......................................................... 219/687
See application file for complete search history.

(56) References Cited

U.S. PATENT DOCUMENTS 3,891,817 A * 6/1975 Brown ...................... F24D 3/02 165/104.31
4,184,060 A 1/1980 Lembens
4,288,674 A * 9/1981 Councell ................. F22B 1/281 219/401
4,310,739 A * 1/1982 Hatem ................... H05B 6/802 219/400
5,338,409 A * 8/1994 Heierli ..................... B01D 3/10 159/DIG. 42
5,387,780 A * 2/1995 Riley ....................... H05B 6/70 219/757
6,064,047 A * 5/2000 Izzo ....................... H05B 6/804 219/688
6,579,501 B1 6/2003 Knapp et al.
7,109,453 B1 * 9/2006 Nadolski ................ H05B 6/802 219/688
7,112,770 B2 * 9/2006 Doh ....................... B64D 13/00 392/397

(Continued)

FOREIGN PATENT DOCUMENTS

CN 212369588 U 1/2021
EP 3075397 A1 10/2016

(Continued)

*Primary Examiner* — Jimmy Chou
(74) *Attorney, Agent, or Firm* — RABIN & BERDO, P.C.

(57) ABSTRACT

A microwave heating device has a microwave generator, a cycling device, an impedance adjuster, a connecting tube, an expanding tube, and a heating assembly serially connected with each other. The connecting tube is bent to extend upward. An inner diameter of the expanding tube gradually increases. The heating assembly includes an outer boiler, an adjusting bottom board, and an inner boiler. The outer boiler has a bottom opening, an outer gas outlet, and an outer liquid inlet. The adjusting bottom board seals the bottom opening. The inner boiler has an inner gas outlet and an inner liquid inlet. The expanding tube expands a microwave field to a uniform intensity, and transmits the microwaves to the adjusting bottom board from bottom to top to heat the liquid, In the heating process, vaporized liquid would discharge upward from a gas outlet, thereby heating the liquid evenly.

12 Claims, 6 Drawing Sheets

(56) References Cited

U.S. PATENT DOCUMENTS

| | | | | |
|---|---|---|---|---|
| 8,901,468 | B2 * | 12/2014 | Bravo | H05B 6/804 392/314 |
| 11,639,225 | B2 * | 5/2023 | Gonzalez | A47J 27/21041 219/678 |
| 2006/0006171 | A1 * | 1/2006 | Sedlmayr | H05B 6/70 219/688 |
| 2006/0006172 | A1 * | 1/2006 | Sedlmayr | B01D 1/2896 219/688 |
| 2006/0159795 | A1 | 7/2006 | Bergman et al. | |
| 2007/0095823 | A1 * | 5/2007 | Sedlmayr | H05B 6/72 219/688 |
| 2008/0053988 | A1 * | 3/2008 | Arai | H05B 6/72 219/121.36 |
| 2009/0134152 | A1 * | 5/2009 | Sedlmayr | H05B 6/806 219/687 |
| 2009/0236334 | A1 * | 9/2009 | Ben-Shmuel | H05B 6/688 219/703 |
| 2011/0132902 | A1 * | 6/2011 | Novak | H05B 6/701 219/690 |
| 2012/0138601 | A1 * | 6/2012 | Hemmings | C10G 1/10 219/679 |
| 2015/0203802 | A1 * | 7/2015 | Mort | C12H 1/165 426/241 |
| 2024/0381502 | A1 * | 11/2024 | Zirkin | H05B 6/802 |

FOREIGN PATENT DOCUMENTS

| | | | |
|---|---|---|---|
| JP | H10-337401 | A | 12/1998 |
| JP | 2019-179649 | A | 10/2019 |
| JP | 3236515 | U | 2/2022 |
| KR | 1020230082812 | A | 6/2023 |
| TW | 200607015 | A | 2/2006 |
| WO | 2005079116 | A2 | 8/2005 |
| WO | 2009/101437 | A1 | 8/2009 |

* cited by examiner

MICROWAVE HEATING DEVICE FOR LIQUID

BACKGROUND

1. Field of the Invention

The present invention relates to a microwave heating device, especially to a microwave heating device configured to boil liquids.

2. Description of the Prior Arts

Conventionally, an indirect heating method is utilized to heat corrosive liquid such as concentrated sulfuric acid, but indirect heating under atmospheric pressure consumes much time and energy, negatively affecting an overall efficiency of a manufacturing process. Therefore, a heating method via microwaves is developed; as shown in FIGS. 5 and 6, a microwave heating device has a microwave generator 90, a cycling device 91, an impedance adjuster 92, a heating assembly 93, and a short-circuit adjuster 94 serially connected to each other. The microwave generator 90 is configured to generate microwaves. The cycling device 91 is configured to protect the microwave source from reflections of the microwaves. A guiding tube 95 is mounted through the heating assembly 93, and the guiding tube 95 extends along a direction perpendicular to a transmission direction of the microwaves. A liquid to be heated passes through the guiding tube 95. The impedance adjuster 92 and the short-circuit adjuster 94 are configured to adjust an impedance matching of the heating assembly 93, ensuring that the liquid is well-heated by the microwaves when the liquid flows through the heating assembly 93.

However, a volume of the liquid expands rapidly while a liquid temperature is rising to a boiling point. When heating the liquid with the aforementioned microwave heating device, a large amount of vaporized liquid expands the volume and pushes the unvaporized liquid out from the heating assembly 93, leading to ineffective heating or superheating and thus the heating effect is reduced and cannot be stabilized.

To overcome the shortcomings, the present invention provides a microwave heating device to mitigate or obviate the aforementioned problems.

SUMMARY

The main objective of the present invention is to provide a microwave heating device that is capable of expanding a microwave field to a uniform intensity of microwaves via an expanding tube and transmitting the microwaves to an adjusting bottom board from a bottom side of an outer boiler, thereby irradiating a liquid evenly from bottom to top.

The microwave heating device has a microwave generator, a cycling device, an impedance adjuster, a connecting tube, an expanding tube, and a heating assembly. An end of the cycling device is connected to the microwave generator; an end of the impedance adjuster is connected to another end of the cycling device. The connecting tube has a bending part and a connecting part, and an end of the bending part and an end of the connecting part are connected to and fluidly communicate with each other; another end of the bending part is connected to another end of the impedance adjuster, and another end of the connecting part extends upward. The expanding tube has a narrow end, a wide end, and multiple adjusting boards. An inner diameter of the expanding tube gradually increases from the narrow end to the wide end, and the narrow end is connected to the connecting part of the connecting tube. The adjusting boards are mounted on an inner wall surface of the wide end, and each one of the adjusting boards contains a dielectric material. The heating assembly includes an outer boiler, an adjusting bottom board, and an inner boiler. The outer boiler has an inner space, a bottom opening, an outer gas outlet, and an outer liquid inlet. The inner space is formed in the outer boiler. The bottom opening fluidly communicates with the inner space. The bottom opening of the outer boiler and the wide end of the expanding tube are connected to each other. The outer gas outlet and the outer liquid inlet fluidly communicate with the inner space respectively. The adjusting bottom board contains the dielectric material, and the adjusting bottom board is mounted in the inner space and seals the bottom opening of the outer boiler. The inner boiler is mounted in the outer boiler, and the inner boiler has an accommodating space, an inner gas outlet, and an inner liquid inlet. The accommodating space is formed in the inner boiler. The inner gas outlet fluidly communicates with the accommodating space and the outer gas outlet. The inner liquid inlet fluidly communicates with the accommodating space and the outer liquid inlet.

The microwave generator generates microwaves, and then the microwaves change a transmitting direction via the connecting tube. The adjusting boards which contain dielectric material in the expanding tube expand a microwave field of the microwaves to a uniform intensity to enlarge a heating area, and then the microwaves are transmitted to the adjusting bottom board via the bottom side of the outer boiler. The adjusting bottom board containing the dielectric material with a proper thickness is configured to adjust the impedance matching, and the microwaves irradiate the liquid from bottom to top. In the heating process, vaporized liquid would discharge upward from the inner gas outlet and the outer gas outlet, thereby preventing the liquid splashing from the heating area due to incapability of balancing the pressure after the liquid is boiled; when the heating achieves an equilibrium state, efficiency may be further increased by adjusting the impedance adjuster, and thereby the liquid may be heated, distilled, or catalyzed directly, rapidly, evenly, and efficiently.

Other objectives, advantages and novel features of the invention will become more apparent from the following detailed description when taken in conjunction with the accompanying drawings.

DETAILED DESCRIPTION

Figure 1:
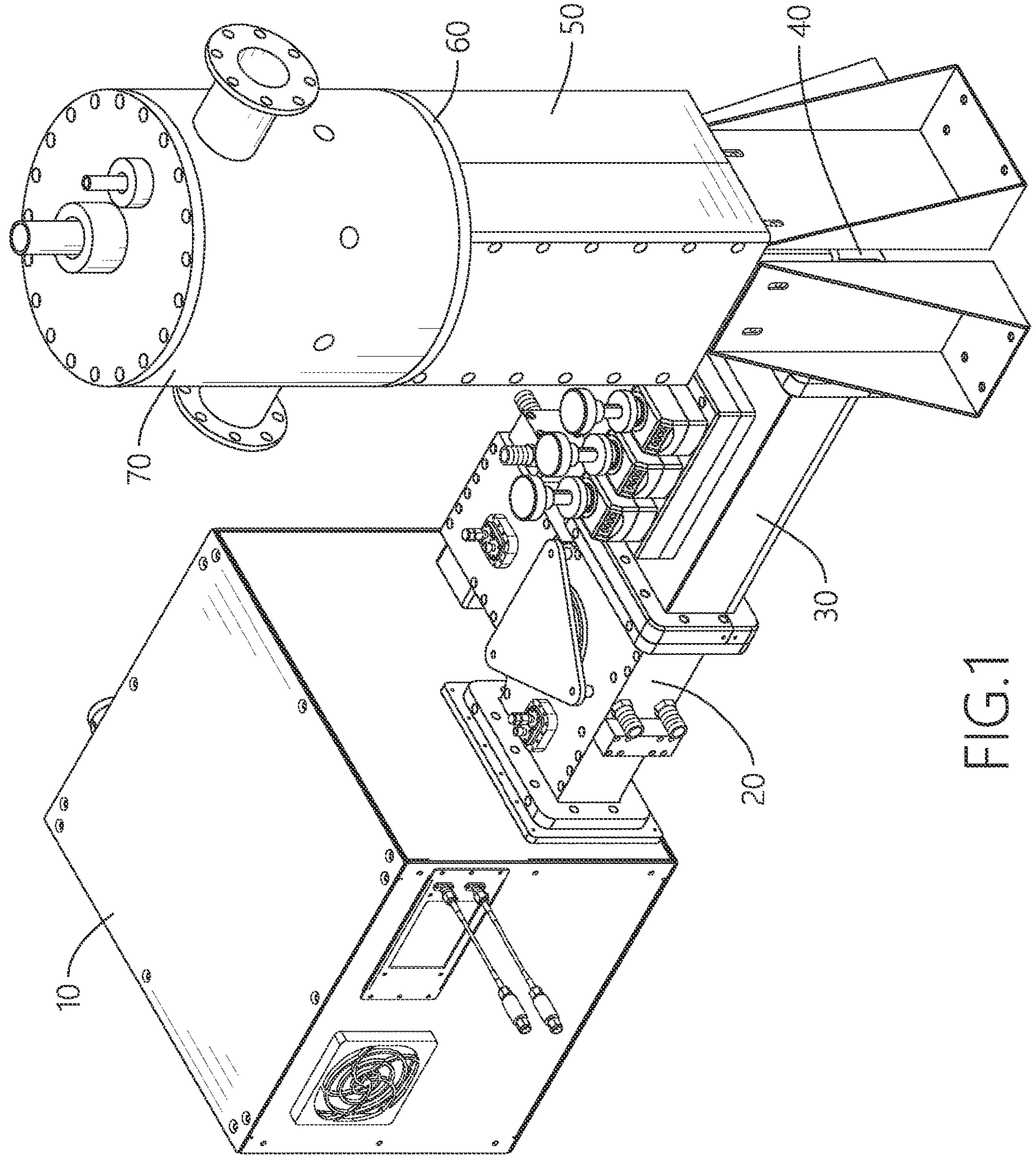
FIG. 1 is a perspective view of a microwave heating device in accordance with the present invention.

With reference to FIG. 1, a microwave heating device in accordance with the present invention comprises a microwave generator 10, a cycling device 20, an impedance adjuster 30, a connecting tube 40, an expanding tube 50, a base 60, and a heating assembly 70.

The microwave generator 10 may be an ordinary device configured to generate microwaves.

An end of the cycling device 20 is connected to the microwave generator 10. The cycling device 20 is configured to protect the microwave source from being affected by reflections of the microwaves. The function and mechanism of the cycling device 20 are conventional and well-known, and thus further explanations about the cycling device 20 are omitted.

An end of the impedance adjuster 30 is connected to another end of the cycling device 20, and the impedance adjuster 30 in this embodiment has three pins, but it is not limited thereto. The impedance adjuster 30 is configured to adjust the microwaves to achieve an impedance matching state, wherein the impedance matching state refers to a state in which high-frequency microwaves are transmitted to a load without reflections back to the source. Such technology is well known in the art, and thus further explanations about the impedance adjuster 30 are omitted.

Figure 2:
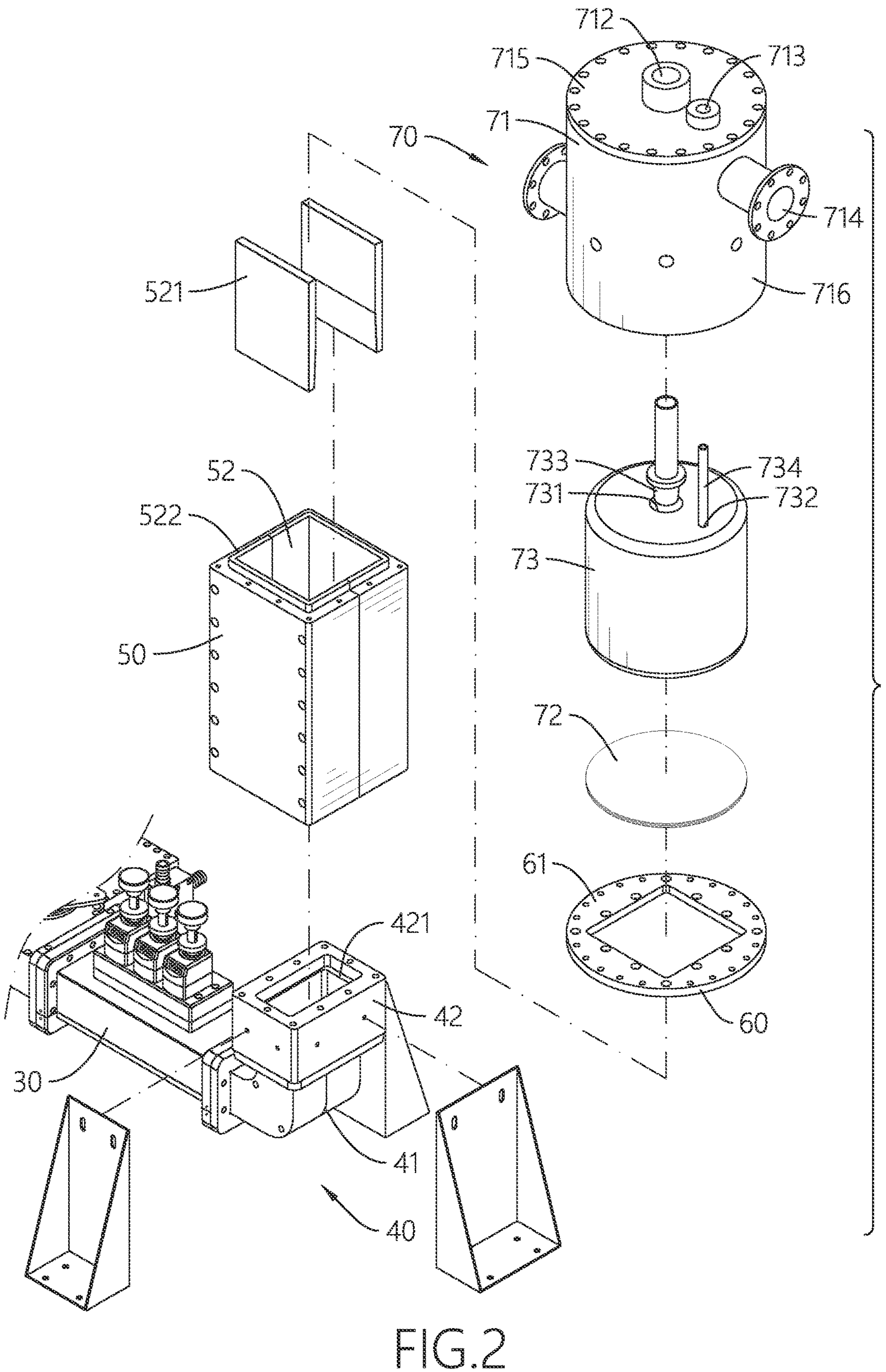
FIG. 2 is an exploded view of the microwave heating device in FIG. 1.
Figure 3:
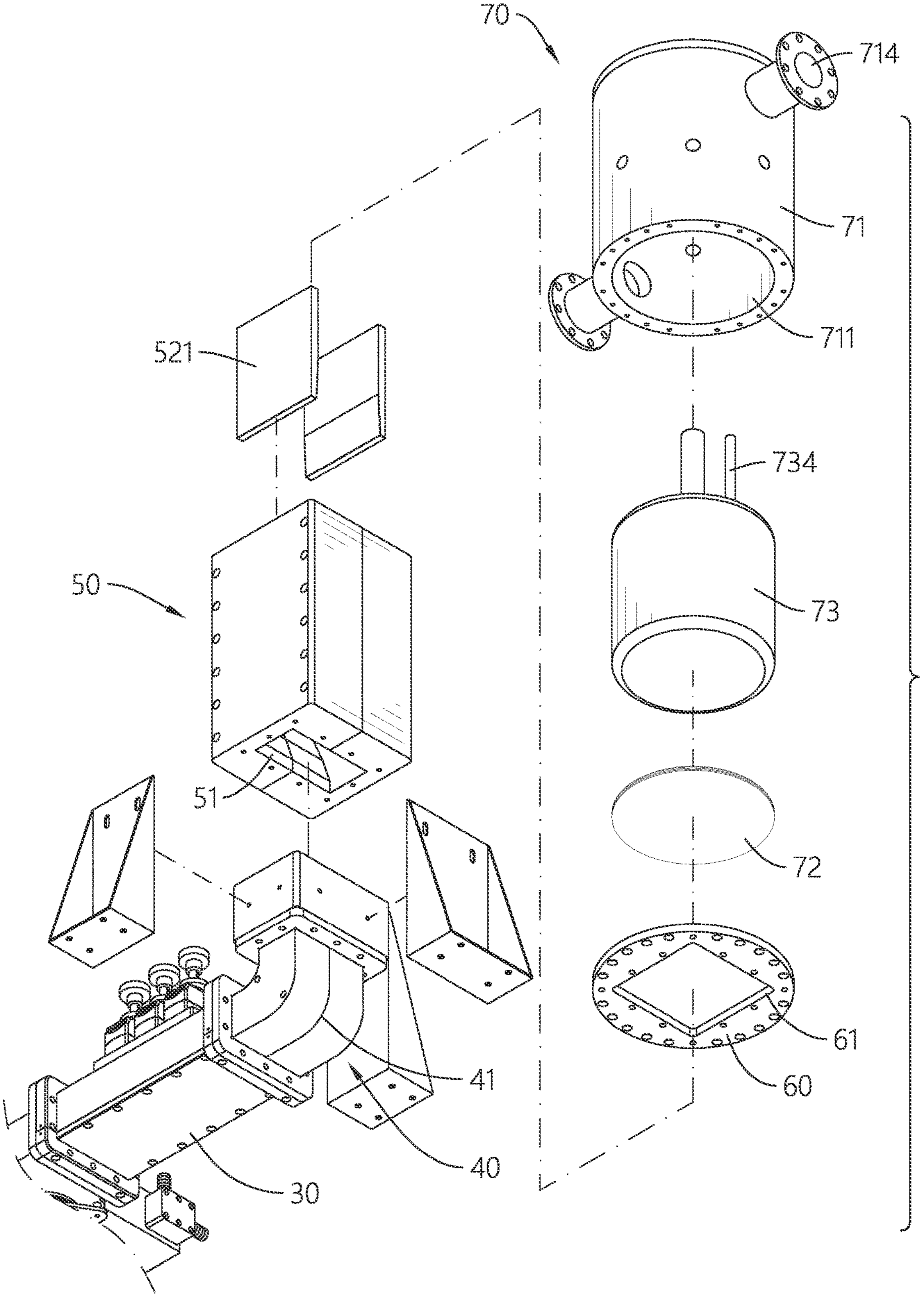
FIG. 3 shows the microwave heating device of FIG. 2 viewed from another angle.
Figure 4:
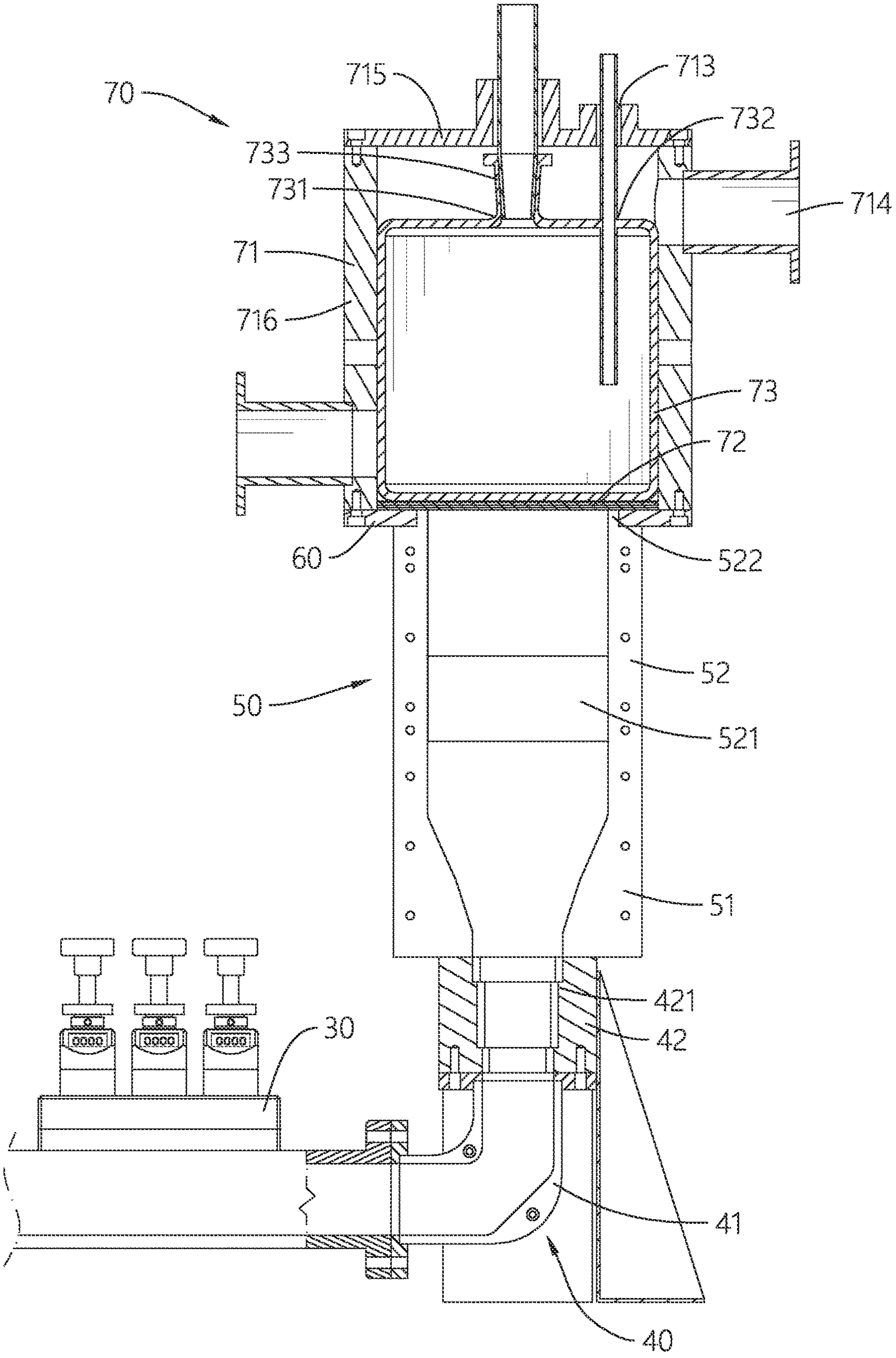
FIG. 4 is a cross-sectional view of the microwave heating device in FIG. 1.
Figure 5:
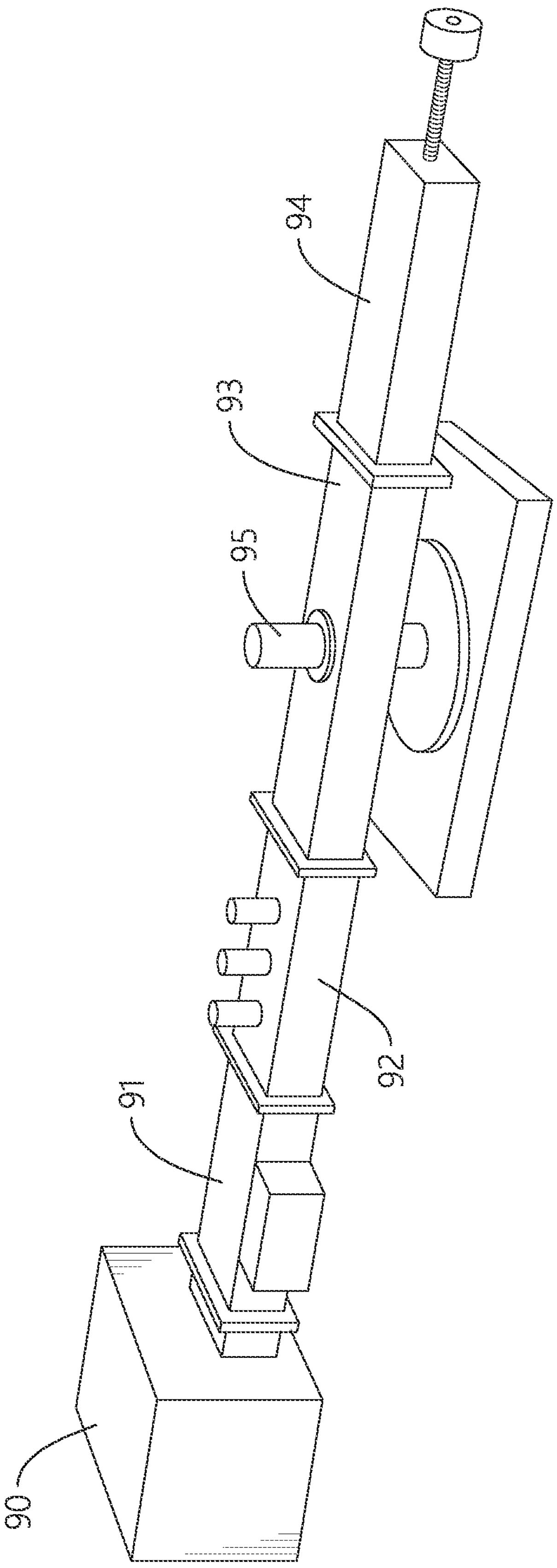
FIG. 5 is a perspective view of the prior art.
Figure 6:
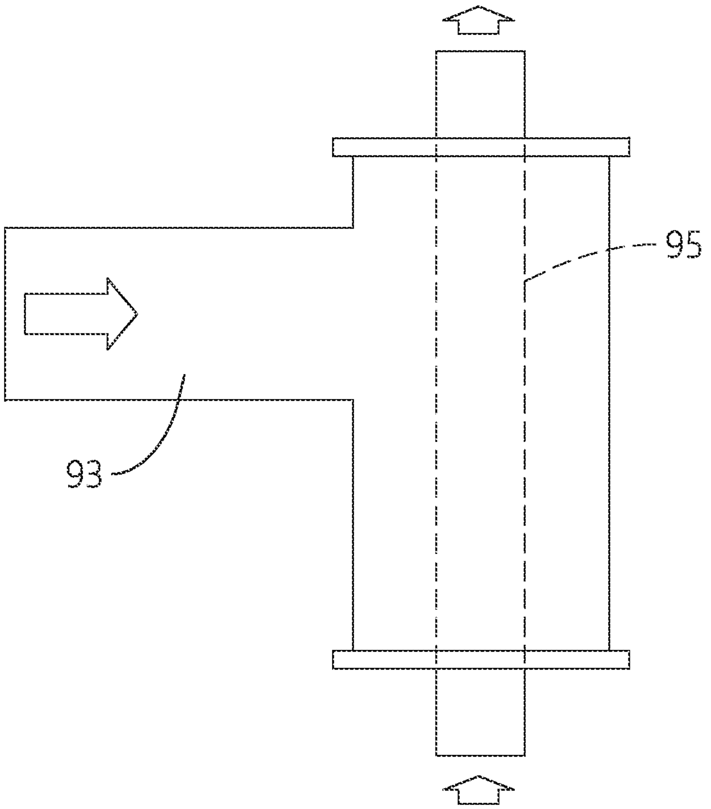
FIG. 6 is a partial enlarged view of the prior art in FIG. 6.

With reference to FIGS. 2 to 4, the connecting tube 40 is a tube with a rectangular cross section. The connecting tube 40 has a bending part 41 and a connecting part 42. An end of the bending part 41 and an end of the connecting part 42 are connected to and fluidly communicate with each other. Another end of the bending part 41 is connected to another end of the impedance adjuster 30, and another end of the connecting part 42 extends upward. To be more precise, the bending part 41 is a curved tube having a bending angle about 90 degrees. On the other hand, when the bending part 41 is put on a plane and an end of the bending part 41 is set horizontal, another end of the bending part 41 would extend upward along a direction perpendicular to said plane.

Multiple protrusions 421 are formed in the connecting part 42. To be more precise, the protrusions 421 protrude from an inner wall surface of the connecting part 42, and the protrusions 421 surround the inner wall surface of the connecting part 42. The protrusions 421 are spaced apart from each other. An inner diameter of the connecting part 42 gradually increases from an end adjacent to the bending part 41 to another end. Besides, multiple brackets may be mounted on an outer annular surface of the connecting part 42 to support the connecting part 42, but it is not limited thereto. The connecting part 42 may not form the protrusions 421, or the connecting tube 40 may be altered in configuration as desired.

The expanding tube 50 is a tube with a rectangular cross section, and the expanding tube 50 has a narrow end 51 and a wide end 52. In addition, an inner diameter of the expanding tube 50 gradually increases from the narrow end 51 to the wide end 52, but an inner diameter of the wide end 52 remains fixed. The narrow end 51 of the expanding tube 50 is connected to the connecting part 42 of the connecting tube 40. Multiple adjusting boards 521 are mounted on an inner wall surface of the wide end 52, and each one of the adjusting boards 521 contains a dielectric material which may include alumina ceramic. An annular protruding rib 522 protrudes from an end surface of the wide end 52, and the annular protruding rib 522 surrounds a tube opening, and said tube opening is formed on the end surface of the wide end 52, but it is not limited thereto, and a configuration of the expanding tube 50 and selection of the dielectric material may be altered as desired.

The base 60 is a disk and forms a perforation hole 61. The perforation hole 61 is rectangular, and a shape of the perforation hole 61 corresponds to a shape of the annular protruding rib 522 of the expanding tube 50. The base 60 is sleeved and fixed on the annular protruding rib 522 via the perforation hole 61, but it is not limited thereto, and the base 60 may be altered in configuration as desired.

The heating assembly 70 includes an outer boiler 71, an adjusting bottom board 72, and an inner boiler 73. The outer boiler 71 has an inner space, a bottom opening 711, an outer gas outlet 712, an outer liquid inlet 713, and multiple observation holes 714. The inner space is formed in the outer boiler 71, and each of the bottom opening 711, the outer gas outlet 712, the outer liquid inlet 713 and the observation holes 714 fluidly communicates with the inner space of the outer boiler 71. In this embodiment, the outer boiler 71 has a top cover 715 and a main body 716. The main body 716 is tubular, and the top cover 715 covers the main body 716. The bottom opening 711 is located at a bottom side of the main body 716, and the outer gas outlet 712 and the outer liquid inlet 713 are located at the top cover 715. Each one of observation holes 714 is located at the main body 716, and each one of the observation holes 714 has a flange adaptor, such that the user is able to observe liquid inside the outer boiler 71, but it is not limited thereto, as the outer boiler 71 may not have the observation hole 714. The base 60 is mounted at the bottom opening 711 of the outer boiler 71, and the outer boiler 71 fluidly communicates with the wide end 52 of the expanding tube 50.

The outer boiler 71 may further have a gas tube protruding from an outer wall of the outer boiler 71, and the outer gas outlet 712 is disposed on an end of the gas tube. Likely, the outer boiler 71 may further have a liquid tube protruding from the outer wall of the outer boiler 71, and the outer liquid inlet 713 is disposed on an end of the liquid tube. Furthermore, the outer boiler 71 may further have multiple observation tubes protruding from the outer wall of the outer boiler 71, and each one of the observation holes 714 is disposed on an end of a corresponding one of the observation tubes. Each one of the gas tube, the liquid tube, and the observation tubes is configured to prevent microwaves leakage with a sufficient length according to waveguide cutoff frequency. Yet it is not limited thereto, as the outer boiler 71 may not have the gas tube, the liquid tube, or the observation tubes.

The adjusting bottom board 72 contains a dielectric material. The adjusting bottom board 72 is mounted in the inner space of the outer boiler 71 and seals the bottom opening 711.

The inner boiler 73 is mounted in the outer boiler 71, and the inner boiler 73 has an accommodating space, an inner gas outlet 731, and an inner liquid inlet 732. The accommodating space is formed in the inner boiler 73, and each of the inner gas outlet 731 and the inner liquid inlet 732 fluidly communicates with the accommodating space of the inner boiler 73. The inner gas outlet 731 fluidly communicates with the outer gas outlet 712, and the inner liquid inlet 732 fluidly communicates with the outer liquid inlet 713. In this embodiment, a gas releasing tube 733 is located at a position aligned with the inner gas outlet 731 and protrudes outward from the inner gas outlet 731. The gas releasing tube 733 is aligned with and fluidly communicates with the outer gas outlet 712 on the outer boiler 71, and in this embodiment, the gas releasing tube 733 extends upward and passes through the outer gas outlet 712, but it is not limited thereto. Likely, a liquid injecting tube 734 is located at a position aligned with the inner liquid inlet 732 and protrudes outward and passes through the outer liquid inlet 713, but it is not limited thereto, and the heating assembly 70 may be altered in configuration as desired.

With reference to FIGS. 1 and 4, when the microwave heating device is in use, a liquid to be heated is injected into the inner boiler 73 through the liquid injecting tube 734. The microwave generator 10 generates microwaves, and the microwaves pass through the cycling device 20 and the impedance adjuster 30, and then change a transmitting direction via the connecting tube 40. The adjusting boards 521 which contain dielectric material in the expanding tube 50 expand a microwave field of the microwaves to a uniform intensity to enlarge a heating area, and then the microwaves are transmitted to the adjusting bottom board 72 via the bottom side of the outer boiler 71. The adjusting bottom board 72 containing the dielectric material with a proper thickness is configured to adjust the impedance matching, and the microwaves irradiate the liquid from bottom to top. In the heating process, vaporized liquid would discharge upward from the inner gas outlet 731 and the outer gas outlet 712, thereby preventing the liquid splashing from the heating area due to incapability of balancing the pressure after the liquid is boiled.

In the aforementioned process, when the heating achieves an equilibrium state, efficiency may be further increased by adjusting the impedance adjuster 30, and thereby the liquid may be heated, distilled, or catalyzed directly, rapidly, evenly, and efficiently.

In the aforementioned process, thanks to the multiple protrusions 421 formed in the connecting part 42, length and width of the connecting tube 40 may be well-matching to the expanding tube 50, which has the larger inner diameter, which means no reflection would be generated. Then the microwaves are well transmitted to the wide end 52 via the narrow end 51.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A microwave heating device comprising:

a microwave generator;

a cycling device, and an end of the cycling device connected to the microwave generator;

an impedance adjuster, and an end of the impedance adjuster connected to another end of the cycling device;

a connecting tube having:

a bending part and a connecting part, an end of the bending part and an end of the connecting part connected to and fluidly communicating with each other, another end of the bending part connected to another end of the impedance adjuster, and another end of the connecting part extending upward;

an expanding tube having:

a narrow end and a wide end, an inner diameter of the expanding tube gradually increasing from the narrow end to the wide end, the narrow end connected to the connecting part of the connecting tube; and multiple adjusting boards mounted on an inner wall surface of the wide end, and each one of the adjusting boards containing a dielectric material;

a heating assembly including:

an outer boiler having:

an inner space formed in the outer boiler;

a bottom opening fluidly communicating with the inner space; the bottom opening of the outer boiler and the wide end of the expanding tube connected to each other;

an outer gas outlet and an outer liquid inlet fluidly communicating with the inner space respectively;

an adjusting bottom board containing the dielectric material, and the adjusting bottom board mounted in the inner space and sealing the bottom opening of the outer boiler; and an inner boiler mounted in the outer boiler, and the inner boiler having:

an accommodating space formed in the inner boiler;

an inner gas outlet fluidly communicating with the accommodating space and the outer gas outlet;

an inner liquid inlet fluidly communicating with the accommodating space and the outer liquid inlet.

2. The microwave heating device as claimed in claim 1, wherein:

the microwave heating device has:

a base forming a perforation hole, and the perforation hole being rectangular in shape; and the expanding tube has:

an annular protruding rib protruding from an end surface of the wide end, and the annular protruding rib surrounding a tube opening, and said tube opening formed on the end surface of the wide end;

the base is sleeved and fixed on the annular protruding rib via the perforation hole.

3. The microwave heating device as claimed in claim 1, wherein:

the connecting tube has:

multiple protrusions protruding from an inner wall surface of the connecting part, and the protrusions surrounding the inner wall surface and spaced apart from each other; and an inner diameter of the connecting part gradually increases from an end of the connecting part adjacent to the bending part to another end of the connecting part.

4. The microwave heating device as claimed in claim 2, wherein:

the connecting tube has:

multiple protrusions protruding from an inner wall surface of the connecting part, and the protrusions surrounding the inner wall surface and spaced apart from each other; and an inner diameter of the connecting part gradually increases from an end of the connecting part adjacent to the bending part to another end of the connecting part.

5. The microwave heating device as claimed in claim 1, wherein the outer boiler has multiple observation holes, and each one of the observation holes is formed through a wall of the outer boiler.

6. The microwave heating device as claimed in claim 4, wherein the outer boiler has multiple observation holes, and each one of the observation holes is formed through a wall of the outer boiler.

7. The microwave heating device as claimed in claim 1, wherein:

the outer boiler has:

a main body being tubular; and a top cover covering the main body, and the outer gas outlet and the outer liquid inlet located on the top cover; and the inner boiler has:

a liquid injecting tube located at a position aligned with the inner liquid inlet, and the liquid injecting tube protruding outward and passing through the outer liquid inlet.

8. The microwave heating device as claimed in claim 6, wherein:

the outer boiler has:

a main body being tubular, and each one of the observation holes located on the main body; and a top cover covering the main body, and the outer gas outlet and the outer liquid inlet located on the top cover; and the inner boiler has:

a liquid injecting tube located at a position aligned with the inner liquid inlet, and the liquid injecting tube protruding outward and passing through the outer liquid inlet.

9. The microwave heating device as claimed in claim 1, wherein the inner boiler has:

a gas releasing tube located at a position aligned with the inner gas outlet, and the gas releasing tube protruding outward; the position of the gas releasing tube corresponding to a position of the outer gas outlet on the outer boiler, and the gas releasing tube fluidly communicating with the outer gas outlet.

10. The microwave heating device as claimed in claim 8, wherein the inner boiler has:

a gas releasing tube located at a position aligned with the inner gas outlet, and the gas releasing tube protruding outward; the position of the gas releasing tube corresponding to a position of the outer gas outlet on the outer boiler, and the gas releasing tube fluidly communicating with the outer gas outlet.

11. The microwave heating device as claimed in claim 1, wherein the bending part is a curved tube having a bending angle, and the bending angle is 90 degrees.

12. The microwave heating device as claimed in claim 10, wherein the bending part is a curved tube having a bending angle, and the bending angle is 90 degrees.

* * * * *